United States Patent
Fillep et al.

(10) Patent No.: US 11,950,533 B2
(45) Date of Patent: Apr. 9, 2024

(54) MOWER COMBINATION

(71) Applicant: AGCO International GmbH, Neuhausen (CH)

(72) Inventors: Johannes Fillep, Feucht (DE); Ronnie Kinast, Ilschwang (DE)

(73) Assignee: AGCO International GmbH, Neuhausen (CH)

(*) Notice: Subject to any disclaimer, the term of this patent is extended or adjusted under 35 U.S.C. 154(b) by 661 days.

(21) Appl. No.: 17/128,086

(22) Filed: Dec. 19, 2020

(65) Prior Publication Data
US 2021/0185929 A1 Jun. 24, 2021

(30) Foreign Application Priority Data
Dec. 19, 2019 (GB) .................................. 1918849

(51) Int. Cl.
*A01D 57/20* (2006.01)
*A01D 34/64* (2006.01)
(Continued)

(52) U.S. Cl.
CPC ............ *A01D 57/20* (2013.01); *A01D 34/64* (2013.01); *A01D 43/077* (2013.01); *A01D 2101/00* (2013.01)

(58) Field of Classification Search
CPC ...... A01D 57/20; A01D 34/64; A01D 43/077; A01D 2101/00; A01D 34/66
See application file for complete search history.

(56) References Cited

U.S. PATENT DOCUMENTS 2,674,082 A * 4/1954 Ryden .................. A01D 57/20
56/192
2003/0024228 A1 2/2003 Franet
(Continued)

FOREIGN PATENT DOCUMENTS

DE 102004028537 A1 8/2005
EP 0 934 690 A1 8/1999
(Continued)

OTHER PUBLICATIONS

European Patent Office, Search report for related European Patent Application No. EP 20 21 2805, dated Apr. 26, 2021.
(Continued)

*Primary Examiner* — Vivek D Koppikar
*Assistant Examiner* — Godfrey Aleksander Maciorowski

(57) ABSTRACT

A mower combination including an agricultural vehicle and a front mowing unit as well as two lateral mowing units located behind and to the sides of the front mowing unit. Each of the lateral mowing units has a conveyor unit to deposit cut crop as a swath. A control unit receiving a plurality of signals from the combination including signals representing a steering angle of the agricultural vehicle, a speed of operation of each conveyor unit and a lateral displacement of each conveyor unit and comparing them against a predetermined set of values. As required the control unit adjusts the speed of operation of at least one conveyor unit based on this comparison. Swaths produced by towed rear mowing units are controlled, in particular to enable aligned curved swaths to be produced when the mower combination is turned, or to enable a narrow swath to be produced when the mower combination is turned.

6 Claims, 6 Drawing Sheets

(51) Int. Cl.
*A01D 43/077* (2006.01)
*A01D 101/00* (2006.01)

(56) References Cited

U.S. PATENT DOCUMENTS

| | | |
|---|---|---|
| 2016/0324066 A1 | 11/2016 | Fay, II |
| 2019/0075720 A1* | 3/2019 | Billich ................ A01B 69/004 |
| 2019/0239429 A1 | 8/2019 | Aposhian et al. |

FOREIGN PATENT DOCUMENTS

| | | |
|---|---|---|
| EP | 2 769 613 A1 | 8/2014 |
| GB | 2 497 577 A | 6/2013 |
| WO | 2018/011016 A1 | 1/2018 |

OTHER PUBLICATIONS

UK Intellectual Property Office, Search report prepared for UK priority Application No. 1918849.9, dated Jun. 15, 2020.

* cited by examiner

MOWER COMBINATION

CROSS REFERENCE TO RELATED APPLICATION

This application claims the benefit of U.K. Application No. GB 1918849.9, filed Dec. 19, 2019, which is hereby incorporated by reference in its entirety.

BACKGROUND

Field

The present invention relates to a mower combination comprising an agricultural vehicle and a number of mowing units suitable for generating swathes of cut crop, and in particular to a mowing apparatus for cutting a standing crop such as hay.

Description of Related Art

It is known to provide a mower combination in which a first mowing unit is located ahead of an agricultural vehicle such as a tractor with two further lateral mowing units trailing the agricultural vehicle. The rear mowing units can optionally be provided with conveyor units for depositing cut crop into a swath or swathes behind the agricultural vehicle.

In a first example, when directed in a straight line, the mower combination is configured to produce three separate aligned swathes of even width.

When turning during a mowing operation, for example to avoid an obstacle, such as a tree or rock, the agricultural vehicle and the front mower turn at a different position to the towed rear mowing units. Thus, instead of three aligned swaths, the swaths produced by the towed rear mowing units become offset from the central swath. This uneven laying down of these swathes creates problems for a following apparatus, for example a self-propelled forage harvester which is to process the swath. These problems are worse if one or other of the swaths produced by the towed rear mowing units overlies the central swath.

In a second example, when directed in a straight line, the mower combination is configured to produce a single central swath. As noted, when turning while mowing, the agricultural vehicle and the front mower turn at a different position to the towed rear mowing units. In such a circumstance the swath may become uneven. This uneven laying down of these swathes creates problems for a subsequent apparatus, for example a baler or loader wagon which is to process the swath. Since the subsequent vehicle might not share the turning radius of the mower combination, it is a problem that the ground engaging wheels of the subsequent vehicle may run over and so damage the swath before it can be processed by the subsequent vehicle.

It is an advantage of the present invention that is seeks to address both of these problems.

SUMMARY

According to a first aspect of the present invention, a mower combination comprises an agricultural vehicle and three mowing units connected to the agricultural vehicle, the mowing units being suitable for cutting a standing crop and comprising a front mowing unit and two lateral mowing units located behind and to the sides of the front mowing unit, each of the lateral mowing units being provided with a conveyor unit to deposit the cut crop as a swath, the mower combination further comprising a control unit receiving a plurality of signals, the signals representing a steering angle and speed of the agricultural vehicle, as well as a speed of operation and a lateral displacement of each conveyor unit, the control unit being configured to receive the plurality of signals and compare the signals for the steering angle and speed of the agricultural vehicle, as well as the speed of operation and the lateral displacement of each conveyor unit against a predetermined set of values and as required to adjust the speed of operation of at least one conveyor unit based on this comparison.

This has as an advantage that the offset of the swaths produced by the towed rear mowing units is controlled, in particular the invention may enable aligned curved swaths or a single narrower central swath to be produced in the event that the mower combination is turned.

Preferably, the control unit may additionally adjust the lateral displacement of the at least one conveyor unit based on the comparison. Alternatively, or additionally, the may additionally adjust the lateral displacement of tone of the lateral units based on the comparison.

According to second aspect of the invention, a method of operation of a mower combination in accordance with the first aspect of the invention to produce three swathes of uniform width comprises providing a predetermined set of values to the control unit, monitoring the steering angle and speed of the agricultural vehicle, as well as the lateral displacement and speed of operation of each of the conveyor units and providing signals representative of the steering angle and speed of the agricultural vehicle, as well as the speed of operation and lateral displacement of the conveyor units to the control unit, the control unit comparing the signals representing for the steering angle and speed of the agricultural vehicle, as well as the speed and the lateral displacement of each conveyor unit against the predetermined set of values and as required signalling at least one conveyor unit to adjust the speed of operation of the at least one conveyor unit based on this comparison.

According to third aspect of the invention, a method of operation of a mower combination in accordance with the first aspect of the invention to produce a single swath of narrow width comprises providing a predetermined set of values to the control unit, monitoring the steering angle and speed of the agricultural vehicle, as well as the lateral displacement and speed of operation of each of the conveyor units and providing signals representative of the steering angle and speed of the agricultural vehicle, as well as the speed of operation and lateral displacement of the conveyor units to the control unit, the control unit comparing the signals representing for the steering angle and speed of the agricultural vehicle, as well as the speed and the lateral displacement of each conveyor unit against the predetermined set of values and as required signalling at least one conveyor unit to adjust the speed of operation of the at least one conveyor unit based on this comparison.

Preferably, the control unit may additionally adjust the lateral displacement of the at least one conveyor unit based on the comparison.

Preferably, the control unit may additionally adjust the lateral displacement of at least one of the lateral mowing units based on the comparison.

According to a fourth aspect of the invention, a computer implemented method comprises the steps of a control unit receiving a plurality of signals, the signals representing the steering angle and speed of an agricultural vehicle, as well as a lateral displacement and a speed of operation of each of a pair of conveyor units, the control unit being configured to receive the plurality of signals and compare the signals for the steering angle and speed of the agricultural vehicle, as well as the speed and the lateral displacement of each conveyor unit against a predetermined set of values and as required to adjust the speed of operation of at least one conveyor unit based on this comparison.

Preferably, the control unit may additionally adjust the lateral displacement of the at least one conveyor unit based on the comparison.

Preferably, the control unit may additionally adjust the lateral displacement of at least one of the lateral mowing units based on the comparison.

According to a fifth aspect of the present invention, a computer readable program comprises instructions that causes one or more processors to implement the method of the second or third aspects of the invention.

BRIEF DESCRIPTION OF THE DRAWINGS

The invention will now be described, by way of example only, with reference to the accompanying drawings, in which.

DETAILED DESCRIPTION OF SPECIFIC EMBODIMENTS

The invention will now be described in the following detailed description with reference to the drawings, wherein preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description.

Reference to terms such as longitudinal, transverse and vertical are made with respect to a longitudinal vehicle axis which is parallel to a normal forward direction of travel. Inward refers to movement relative to a central longitudinal axis. Associated terms such as outward should be construed accordingly.

Figure 1:
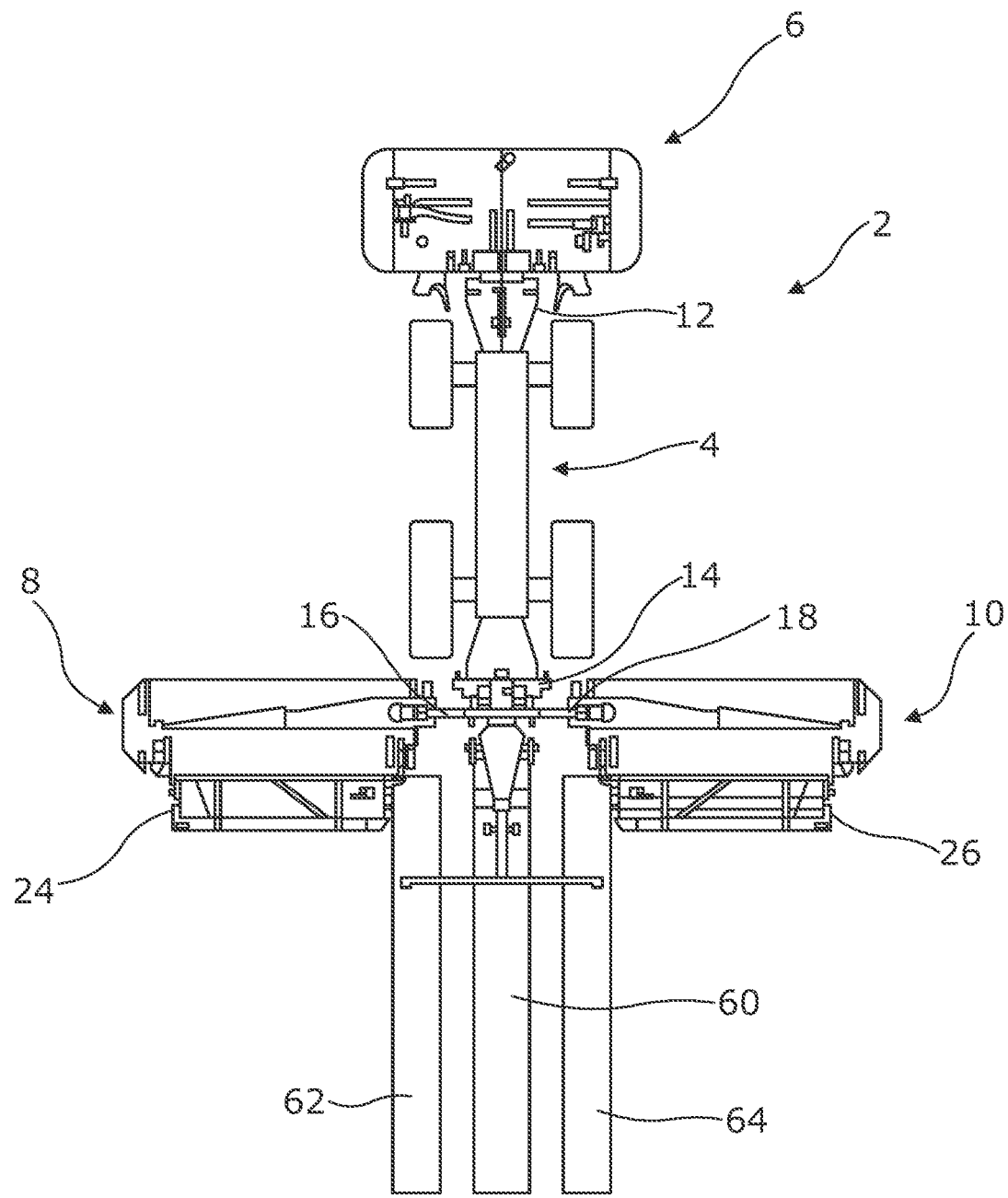
FIG. 1 shows a schematic plan view of a known mower combination.
Figure 2:
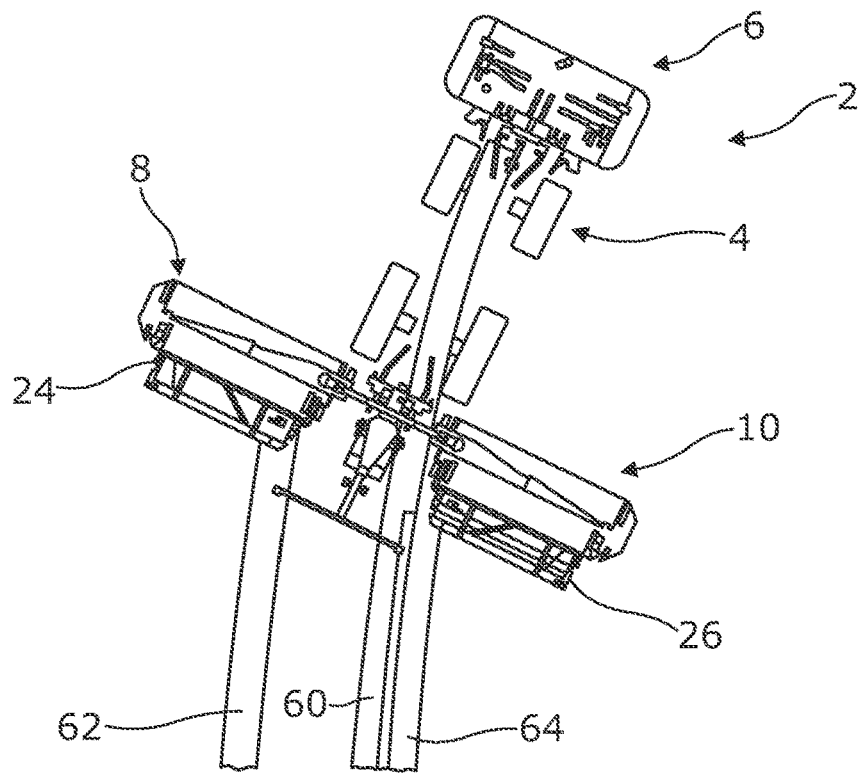
FIG. 2 shows a schematic plan view of a known mower combination absent the present invention conducting a turning manoeuvre.
Figure 3:
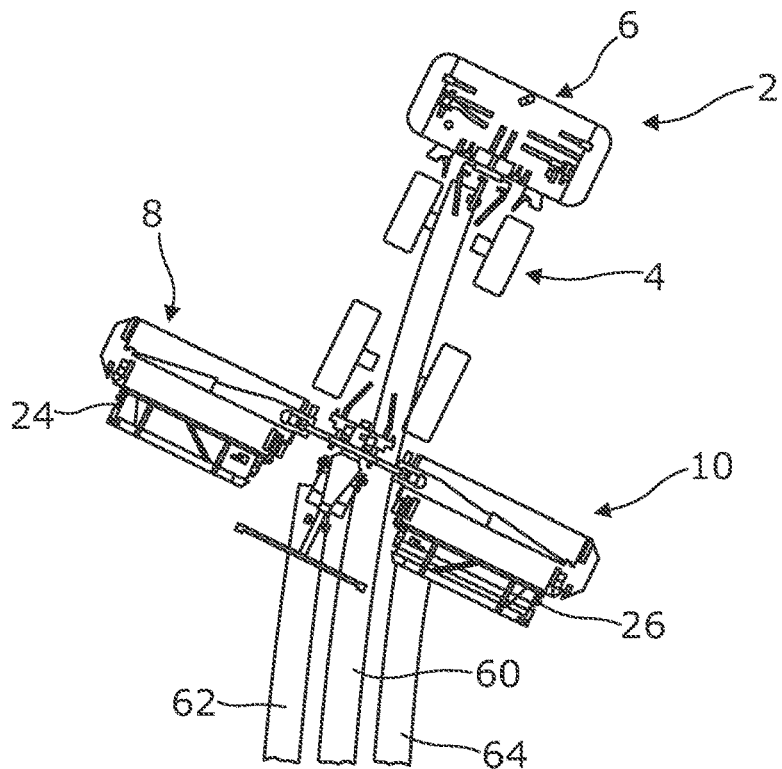
FIG. 3 shows a schematic plan view of a mower combination according to a first aspect of the present invention conducting a turning manoeuvre.

In FIGS. 1 and 2, a schematic plan view of a known mower combination 2 is shown. While FIG. 3 shows a schematic plan view of a mower combination in accordance with the present invention like reference numerals have been used to refer to like parts.

A mower combination 2 comprises an agricultural vehicle 4 such as a tractor and a number of mowing units 6,8,10 suitable for cutting a standing crop, such as grass, the mowing units 6,8,10 being connected to the agricultural vehicle. The mowing units include a front mowing unit 6 located to the front of the agricultural vehicle 4 and two lateral mowing units 8,10 located behind and to the sides of the agricultural vehicle 4, each of the mowing units 6,8,10 being adapted to cut the standing crop. The front mowing unit 6 is conveniently mounted on a front hitch 12 of the agricultural vehicle 4. The two lateral mowing units 8,10 are conveniently mounted on a central chassis supported from a rear hitch 14 of the agricultural vehicle 4.

Figure 7:
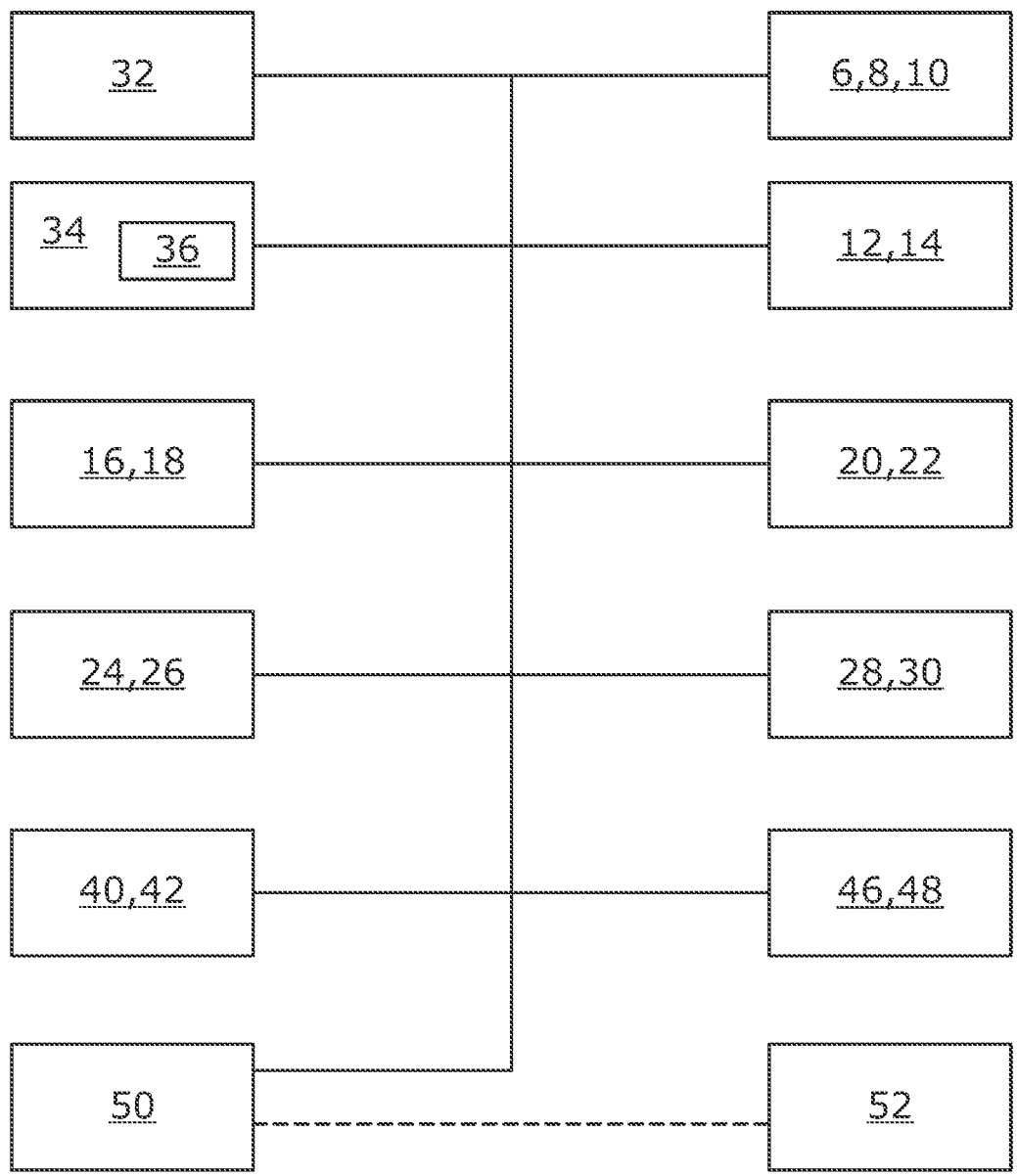
FIG. 7 shows a schematic view of elements of a mower combination for use in the present invention.

The lateral mowing units 8,10 are supported from a central chassis by hydraulic apparatus 16,18. Each hydraulic apparatus 16,18 may be used to move a respective lateral mowing unit 8,10 from a working position to a transport position. A headland position may be defined between the working position and the transport position. In the working position the height of each of the lateral mowing units 8,10 above the ground surface may be further controlled by operation of the hydraulic apparatus 16,18. Additional hydraulic apparatus 20,22 (not shown in FIGS. 1-4, noted in FIG. 7) may be used to control the lateral displacement of the working position of each lateral mowing unit 8,10.

In the illustrated embodiment of FIGS. 1 to 4, a swath 60 produced by the front mowing unit 6 is shown. In practice, conveyor units 24,26 mounted to the rear of the lateral mowing units 8,10 are adapted to direct the deposit of cut crop material from each of the lateral mowing units 8,10 to one side or the other of the respective lateral mowing units 8,10 as desired, for example to produce a single central swath or one or more additional swathes.

The conveyor units 24,26 are mounted to be displaceable with respect to the lateral mowing units 8,10. The conveyor units 24,26 may be displaced by hydraulic apparatus 28,30 (not shown in FIGS. 1-4, noted in FIG. 7) or other suitable apparatus. The conveyor units 24,26 may be mounted to be displaced upwards from an active position to an inactive position such that in the inactive position the conveyor units 24,26 do not affect the swath produced by the mowing unit.

In the illustrated example of FIGS. 1 and 2, the left hand mowing unit and associated conveyor generate a swath 62 to the right of the mowing unit and spaced from the central swath 60, while the right hand mowing unit and associated conveyor generate a swath 64 to the left of the mowing unit and spaced from the central swath 60. In FIG. 1, while the mower is towed directly behind the agricultural vehicle on a straight heading, the side swathes 62,64 are deposited parallel to the central swath 60. In FIG. 2, as the agricultural vehicle 4 adopts a different heading the side swathes 62,64 become offset from the central swath 60. It can be seen in the illustrated example of FIG. 2, the central swath 60 becomes overlaid with the right hand swath 64, while the left hand swath 62 becomes widely spaced from the central swath 60.

The conveyor units 24,26 can comprise conveyor belts or conveyor screws. The speed of operation of the conveyor units may also be controlled. By way of example, increasing the speeds of the conveyor units 24,26 will result in displacement of the generated swaths 62,64 toward the central swath 60.

Figure 4:
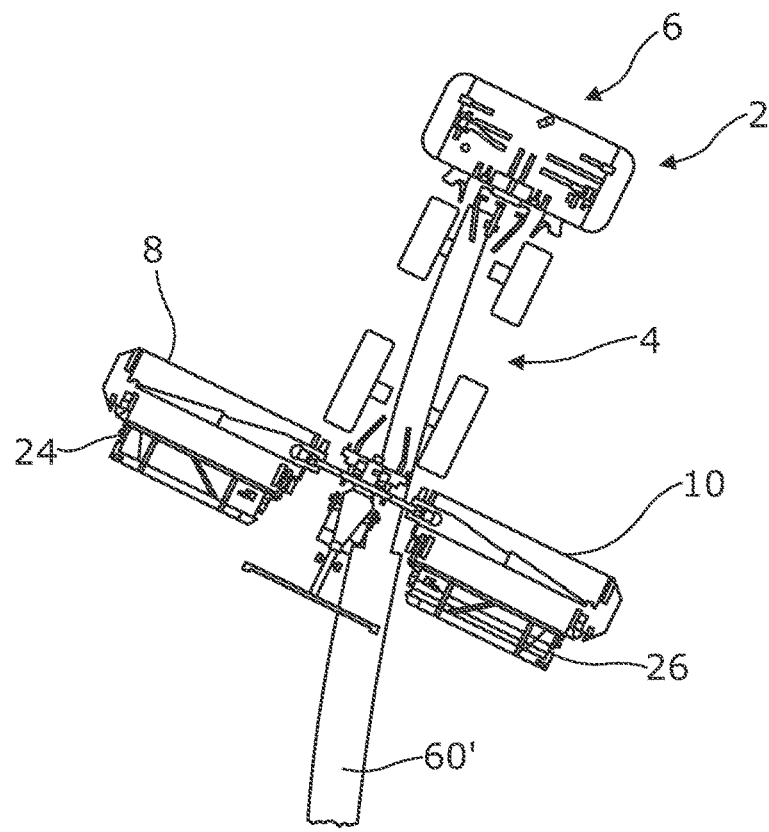
FIG. 4 shows a schematic plan view of a mower combination according to a second aspect of the present invention conducting a turning manoeuvre.

An operator can control operation of the front and rear mowing units 6,8,10 from within the agricultural vehicle 4 by use of a suitable user terminal 32 (FIG. 4). For example the operator can control displacement of the conveyor units 24,26, and/or the speed of operation of the conveyor units 24,26, can cause each of the mowing units 6,8,10 to move from a working position to a headland position, can cause the rear mowing units 8,10 to move from the working position to a transport position, or can cause the conveyor units 24,26 to move from an active position to an inactive position. It is an advantage of the present invention that while an operator can control operation of the conveyor units using the user terminal the present invention eliminates or at least substantially reduces the need to do so.

The user terminal 32 communicates with an electronic control unit 34. The electronic control unit 34 may provide signals to control operation of the front and rear hitches 12,14 of the agricultural vehicle 4 and provides signals to control operation of the mowing units 6,8,10 and the conveyor units 24,26. Conveniently the signals are provided by way of a suitable data communication network 38 such as one compliant with the ISOBUS standard (a network in conformance to ISO 11783).

The electronic control unit 34 may conveniently comprise a single processor located on the agricultural vehicle or its functions may be split between a processor located on the agricultural vehicle and one or more additional processors located on the mowing units 6,8,10, the additional processor (s) being in electronic communication with the first processor.

The electronic control unit 34 is also able to access a suitable memory 36. The memory 36 may take any suitable form and is in electronic communication with the electronic control unit 34. The memory 36 is adapted to store, in any suitable manner such as a database or look up table, reference values for the steering angle of the agricultural vehicle, the speed of operation of each conveyor unit and the lateral displacement of each conveyor unit.

The mower combination 2 further comprises a plurality of sensors adapted to provide input signals to be received by the electronic control unit 34.

A signal 40 representing the steering angle of the agricultural vehicle can be provided from a suitable sensor mounted within the agricultural vehicle. A speed signal 42 representative of the forward velocity of the agricultural implement may be provided from the agricultural vehicle.

Suitable lateral displacement sensors mounted on the mower combination 2, for example on the mowing units 8,10 can provide input signals representative of the lateral displacement of the mowing units 8,10. The displacement may be measured from any suitable reference point.

Suitable sensors 46 mounted on the mower combination 2, for example on the conveyor units 24,26, can provide input signals representative of the speed of operation of each conveyor unit 16,18. A further sensor or sensors 48 mounted, for example, on the conveyor units 24,26 can provide input signals representative of the displacement of each conveyor in either the active or inactive position.

Figure 8:
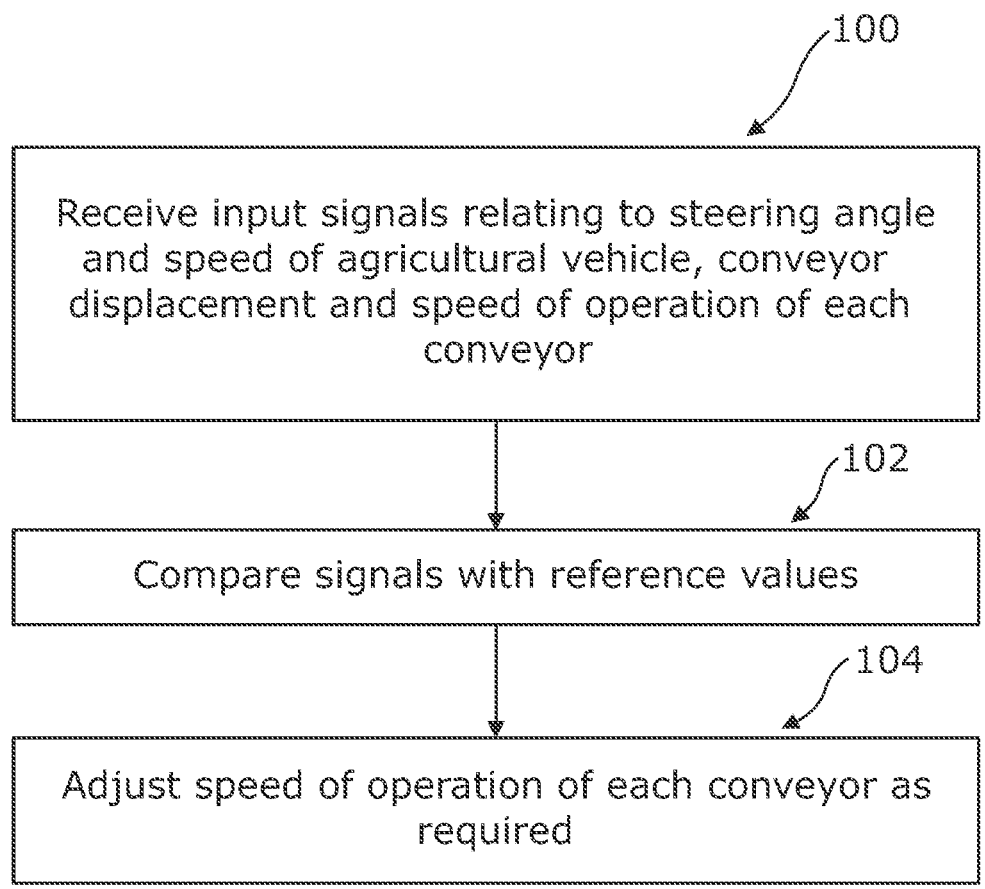
FIG. 8 shows a flow diagram illustrating an example control method for swath formation in accordance with the present invention.

A mower combination in accordance with the present invention is directed within a field, for example, either driven by a driver or directed by an autonomous control system) (step 100, FIG. 8). In the case of an autonomous control system, it will be understood that a network interface 50 connected to the electronic control unit 34 may be provided. The network interface 50 can comprise hardware and/or software that enables wireless connection to one or more remotely located computing devices 52 over a network (e.g., a wireless or mixed wireless and wired network). For instance, the network interface 50 may cooperate with browser software or other software of the electronic control unit 34 to communicate with a server device, enabling remote control and monitoring of the mower combination 2. The network interface may also be used to supply and update the reference values to the memory 36.

While the mower combination 2 is being directed with the field, the control unit receives a plurality of signals, including signals representative of the direction of steering and speed of the agricultural vehicle, and the position of each mowing unit and its associated conveyor as well as the speed of operation of the conveyor (step 102). A comparison of the input signals received by the electronic control unit 34 is made with the reference values stored in the memory 36 (step 104). The electronic control unit 34, as appropriate, then causes a change of speed of operation of at least one conveyor unit 16,18 (step 106) such that the desired swath pattern is produced.

The electronic control unit 34 may additionally cause a change in the lateral displacement of one or both of the conveyor units 24,26 and/or a change in the lateral displacement of one or both of the lateral mowing units 8,10.

In a first embodiment of the invention, as shown for example in FIG. 3, when the agricultural vehicle is steered to the right, the left hand mowing unit and conveyor unit are configured to move the deposited swath 62 inward, by increasing the speed of operation of the left hand conveyor unit. The conveyor unit and/or the mowing unit may also be additionally displaced inward. At the same time the right hand mowing unit and conveyor unit are configured to deposit the swath 64 slightly outward, by decreasing the speed of operation of the right hand conveyor unit. In this way the depositing of the side swathes 62,64 is controlled such that the side swathes 62,64 continue to be deposited at a desired evenly spaced distance from the central swath 60 (FIG. 3) even while the mower combination is being turned.

It will be understood that when steering to the left, the speed of operation of the right hand conveyor unit in increased, while the speed of operation of the left hand convenor unit is increased.

The control unit may also contain reference values relating to a desired lateral displacement of each lateral mowing unit 8,10, and monitor the lateral displacement of these mowing units such that each lateral mowing unit may also additionally be laterally displaced as required.

In a second embodiment of the invention, the left hand mowing unit and associated conveyor generate a swath 62 to the right of the mowing unit adjacent the swath 60 generated by the front mowing unit, while the right hand mowing unit and associated conveyor generate a swath 64 to the right of the mowing unit adjacent the swath 60. While the mower combination is directed on a straight heading, a single swath 60' of triple width may be produced. Similar problems arise as before when the mower combination is turned, in that the inner edge moves into the curve and the outer end moves outward, though generally a single triple width swath 60', albeit uneven is produced.

Figure 5:
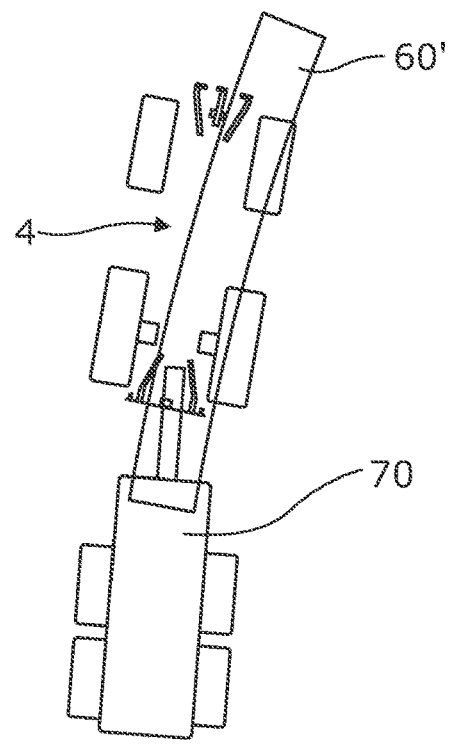
FIG. 5 shows a schematic plan view of a subsequent apparatus traversing a known single swath of constant width.

However, as illustrated in FIG. 5 where a subsequent vehicle takes the form of a baler or loader wagon with a pick up 70 for the swath 60', due to the different spacing between the agricultural vehicle 4 and the pick up 70 (when compared to the separation of the agricultural vehicle and the mowing units generating the swath) in order to align the pick up with the swath 60' it may be necessary to drive over the swath 60', so damaging the crop in the swath.

To overcome this problem, whether the agricultural vehicle 5 is steered to the right, as in the illustrated embodiment, or to the left, the lateral mowing units and the associated conveyor units are configured to move the deposited swathes inward, by increasing the speed of operation of the left and right hand conveyor units 24,26. Each conveyor unit 16, 18 and/or the mowing unit 6,8 may also be additionally displaced inward. In this way the depositing of the swathes produced by the lateral mowing units 6,8 are directed inwardly to produce a single swath 60" of narrower width during turning.

Figure 6:
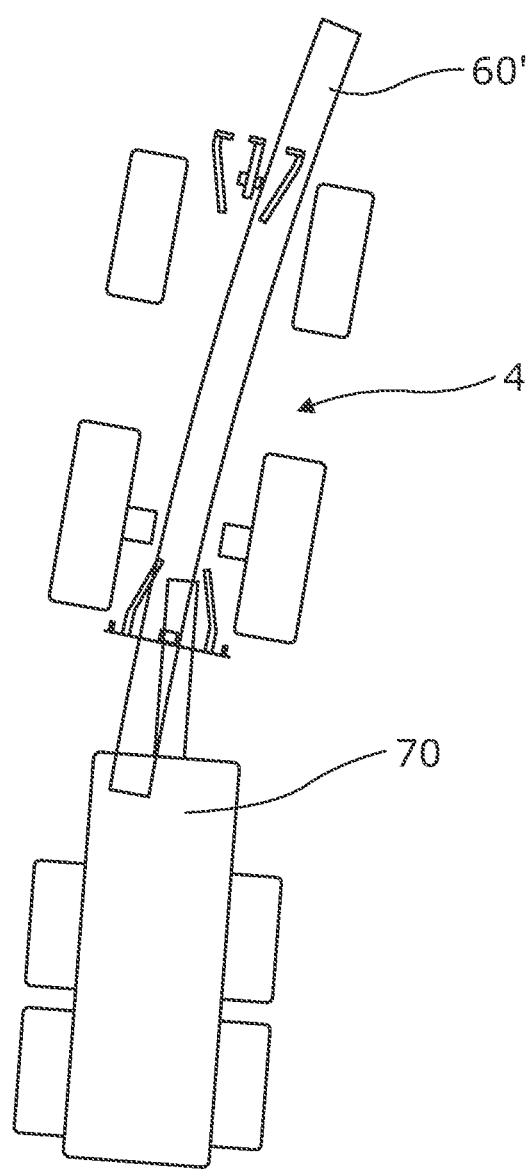
FIG. 6 shows a schematic plan view of a subsequent apparatus traversing a narrower single swath of constant width produced by a mower combination in accordance with the second aspect of the present invention.

As shown in FIG. 6, this results in the subsequent apparatus being able to align the pick up 70 with the swath 60" without driving over the swath 60".

From reading the present disclosure, other modifications will be apparent to persons skilled in the art. Such modifications may involve other features which are already known in the field of mowers and component parts therefore and which may be used instead of or in addition to features already described herein.

The invention claimed is:

1. A mower combination comprising an agricultural vehicle and a number of mowing units suitable for cutting a standing crop connected to the agricultural vehicle, including a front mowing unit and two lateral mowing units located behind and to the sides of the front mowing unit, each of the lateral mowing units comprising a respective conveyor units to deposit cut crop as a swath, the mower combination further comprising:
  a control unit comprising:
    at least one processor; and
    at least one non-transitory computer-read storage medium storing instructions thereon that, when executed by the at least one processor, cause the control unit to:
      receive operation data representing a current steering angle of the agricultural vehicle, a current speed of operation of each conveyor unit, and a current lateral displacement of each conveyor unit of the lateral mowing unit;
      based at least partially on the received operation data, adjust a lateral position of at least one conveyor unit relative to a respective lateral mowing unit of the two lateral mowing units; and
      based at least partially on the received operation data, adjust a speed of operation of at least one conveyor unit of the two lateral mowing units.

2. The mower combination of claim 1, wherein the control unit further comprises instructions that, when executed by the at least one processor, cause the control unit to, based at least partially on the received operation data, adjust a lateral displacement of at least one lateral mowing unit of the two lateral mowing units.

3. A method of operating a mower combination to produce swathes of uniform width while the mower combination is being turned turned, the method comprising:
  monitoring a steering angle of an agricultural vehicle;
  monitoring lateral displacements of conveyor units of two lateral mowing units connected to the agricultural vehicle relative to longitudinal axis of the agricultural vehicle;
  monitoring speeds of operation of each of the conveyor units;
  based at least partially on the monitored steering angle, the monitored lateral displacements of the conveyor units, and the monitored speeds of operation of the conveyor units, adjusting a lateral position of at least one conveyor unit relative to a respective lateral mowing unit of the two lateral mowing units; and
  based at least partially on the monitored steering angle, the monitored lateral displacements of the conveyor units, and the monitored speeds of operation of the conveyor units, adjusting a speed of operation of at least one conveyor unit of the two lateral mowing units.

4. The method of claim 3, further comprising, based at least partially on the monitored steering angle, the monitored lateral displacements of the conveyor units, and the monitored speeds of operation of the conveyor units, adjusting a lateral displacement of at least one lateral mowing units of the two lateral mowing units relative to the longitudinal axis of the agricultural vehicle.

5. A computer implemented method comprising:
  monitoring a steering angle of an agricultural vehicle;
  monitoring lateral displacements of conveyor units of two lateral mowing units connected to the agricultural vehicle relative to longitudinal axis of the agricultural vehicle;
  monitoring speeds of operation of each of the conveyor units;
  based at least partially on the monitored steering angle, the monitored lateral displacements of the conveyor units, and the monitored speeds of operation of the conveyor units, adjusting a lateral position of at least one conveyor unit relative to a respective lateral mowing unit of the two lateral mowing units; and
  based at least partially on the monitored steering angle, the monitored lateral displacements of the conveyor units, and the monitored speeds of operation of the conveyor units, adjusting a speed of operation of at least one conveyor unit of the two lateral mowing units.

6. A computer implemented method of claim 5, further comprising adjusting a lateral displacement of at least one of the lateral mowing units of the two lateral mowing units relative to the longitudinal axis of the agricultural vehicle.

* * * * *